(12) United States Patent
Mochizuki et al.

(10) Patent No.: US 12,344,502 B2
(45) Date of Patent: Jul. 1, 2025

(54) INDEX TAB FORMING SYSTEM

(71) Applicant: Horizon International Inc., Takashima (JP)

(72) Inventors: Jun Mochizuki, Takashima (JP); Yasuo Taketsugu, Takashima (JP)

(73) Assignee: Horizon International Inc., Takashima (JP)

( * ) Notice: Subject to any disclaimer, the term of this patent is extended or adjusted under 35 U.S.C. 154(b) by 594 days.

(21) Appl. No.: 17/771,323

(22) PCT Filed: Oct. 25, 2019

(86) PCT No.: PCT/JP2019/042033
§ 371 (c)(1),
(2) Date: Apr. 22, 2022

(87) PCT Pub. No.: WO2021/079519
PCT Pub. Date: Apr. 29, 2021

(65) Prior Publication Data
US 2022/0371840 A1 Nov. 24, 2022

(51) Int. Cl.
*B65H 7/02* (2006.01)
*B26D 1/36* (2006.01)
(Continued)

(52) U.S. Cl.
CPC ............. *B65H 7/02* (2013.01); *B26F 1/384* (2013.01); *B65H 5/062* (2013.01); *B65H 7/18* (2013.01); *B65H 2513/10* (2013.01)

(58) Field of Classification Search
CPC ...... B65H 2513/10; B65H 5/062; B65H 7/02; B65H 7/14; B65H 7/20; B26D 5/06;
(Continued)

(56) References Cited

U.S. PATENT DOCUMENTS

| 9,522,478 B2 | 12/2016 | Mochizuki et al. |
| 2014/0037359 A1 | 2/2014 | Nakajima et al. |
| 2014/0103599 A1 | 4/2014 | Tojo et al. |

FOREIGN PATENT DOCUMENTS

| CN | 103568598 A | 2/2014 |
| CN | 103723534 A | 4/2014 |

(Continued)

OTHER PUBLICATIONS

European Extended Search Report dated Jun. 29, 2023 in corresponding application 19950206.3.

*Primary Examiner* — Luis A Gonzalez
(74) *Attorney, Agent, or Firm* — Muncy, Geissler, Olds & Lowe, P.C.

(57) ABSTRACT

An index tab forming system sequentially forms index tabs to a plurality of sheets without replacing a blade die. The index tab forming system includes a rotary die cutter 5 on which a long blade die that can form an index tab at any position of the sheet in the conveyance direction is mounted. Furthermore, the index tab forming system includes a rotational speed calculation unit configured to calculate the rotational speed of a conveyance roller pair 37 based on the rotational position of a die cut roller 50, a sheet position detection signal provided by a sheet detection sensor 40, the number of times of sheet conveyance, and a shift distance between respective index tabs and a conveyance roller control unit configured to control the rotational speed of the conveyance roller pair 37 based on the calculated rotational speed.

15 Claims, 5 Drawing Sheets

(51) Int. Cl.
*B26D 5/06* (2006.01)
*B26F 1/38* (2006.01)
*B65H 5/06* (2006.01)
*B65H 7/18* (2006.01)

(58) Field of Classification Search
CPC . B26D 5/007; B26D 5/28; B26D 5/32; B26D 1/365; B26D 1/36; B26D 1/38; B26D 1/385; B26D 1/40; B26D 1/405; B26F 1/38; B26F 1/384; B26F 1/3826
See application file for complete search history.

(56) References Cited

FOREIGN PATENT DOCUMENTS

| | | | |
|---|---|---|---|
| CN | 208246992 U | | 12/2018 |
| EP | 2796256 A2 | | 10/2014 |
| JP | H 11-198098 A | | 7/1999 |
| JP | 2943105 B2 | | 8/1999 |
| JP | 2001-105395 A | | 4/2001 |
| JP | 2014217911 A | * | 11/2014 |
| JP | 2015-006702 A | | 1/2015 |

* cited by examiner

INDEX TAB FORMING SYSTEM

CROSS REFERENCE TO RELATED APPLICATIONS

This application is a National Stage of International Application No. PCT/JP2019/042033, filed on Oct. 25, 2019, for which priority is claimed under 35 U.S.C. § 120; the entire contents of which are hereby incorporated by reference.

TECHNICAL FIELD

The present invention relates to an index tab forming system that forms index tabs on sheets, in particular, to an index tab forming system including a rotary die cutter.

BACKGROUND ART

There is a rotary die cutter system that punches a desired die out of a sheet while conveying the sheet. For example, a rotary die cutter system disclosed in Patent Literature 1 includes a sheet feeding unit configured to feed a sheet, a conveyance unit configured to convey the sheet to a rotary die cutter, and a rotary die cutter having a die cut roller and a receiving roller arranged parallel to the die cut roller. This rotary die cutter system further includes a detection unit configured to detect a rotational position of the die cut roller, which conveys the sheet to the rotary die cutter at a predetermined timing based on the detected rotational position of the die cut roller. In this rotary die cutter system, the die cut roller has a magnet roller and a blade die detachably wound around the magnet roller. With a desired punching blade die being wound around the magnet roller, the rotary die cutter system can punch a desired die.

Conventionally, in forming index tabs to sheets by using such a rotary die cutter, it is required to prepare blade dies in accordance with positions of index tabs, respectively. Thus, to process a booklet having a plurality of index tabs, cost of making blade dies is required for the number of index tabs. In addition, this case requires the blade die to be replaced to change the position of an index tab to be punched and further requires collation of the punched sheets. Therefore, significant effort and time are needed to make the above booklet.

CITATION LIST

Patent Literature

[PTL 1]
Japanese Patent Application Laid-Open No. 2015-006702

SUMMARY OF INVENTION

Technical Problem

Accordingly, an object to be achieved by the present invention is to provide an index tab forming system that can sequentially form index tabs on a plurality of sheets without replacing a blade die.

Solution to Problem

To achieve the above object, an index tab forming system according to the present invention is provided as an index tab forming system configured to sequentially form index tabs to a plurality of sheets, and the index tab forming system includes:
a rotary die cutter having a die cut roller in which a sheet-like blade die used for index tab forming is mounted and a receiving roller arranged parallel to the die cut roller with a predetermined spacing to the die cut roller;
a rotational position detector configured to detect a rotational position of the die cut roller;
a memory storing a position of a front end of a top index tab of the index tabs, a shift distance between the index tabs, the total number of index tabs, and a position of a front end of an index tab portion of the blade die;
a sheet stacker configured to stack a sheet stack;
a sheet feeding unit configured to feed the sheet one by one from the sheet stack;
a conveyance unit configured to convey the sheet received from the sheet feeder to the rotary die cutter, the conveyance unit including a conveyor extending between the sheet feeder and the rotary die cutter and configured to convey the sheet, a sheet detection sensor arranged in downstream of the conveyor and configured to detect a position of the sheet, and a conveyance roller pair arranged parallel to the die cut roller and configured to convey the sheet;
a conveyance counter configured to count the number of times that the conveyance unit conveys the sheet to the rotary die cutter;
a rotational speed calculation unit configured to calculate a rotational speed of the conveyance roller pair based on the rotational position of the die cut roller, a detection signal generated when the sheet detection sensor detects a sheet position, the number of times that the conveyance unit conveys the sheet to the rotary die cutter, and a shift distance between the index tabs, the conveyance roller pair being configured to cause a front end of an index tab portion of the blade die and a front end of each of the index tabs formed on the sheet to match at the lowermost point of the die cut roller; and
a conveyance roller controller configured to control a rotational speed of the conveyance roller pair based on a rotational speed calculated by the rotational speed calculation unit,
wherein the blade die has a circumferential length that is sufficiently longer than a length of the sheet so that the index tab is formed at any position of the sheet in a conveyance direction.

In the index tab forming system described above, for example, every time the last sheet to which the index tab is formed is conveyed to the rotary die cutter, the conveyance counter resets a count of the number of times that the sheet is conveyed to the die cut roller.

The index tab forming system described above preferably further includes:
a sheet feeding controller configure to control an operation of the sheet feeder;
a sheet feeding counter configured to count the number of times that the sheet feeder feeds a sheet;
a sheet feeding timing determination unit configured to determine a sheet feeding timing of the sheet to which the top index tab is formed; and
a shift period calculation unit configured to calculate a period to shift a feeding timing of the sheet based on a shift distance between the index tabs and the number of times that the sheet feeding unit feeds a sheet, wherein the sheet feeding controller controls the sheet feeder based on the rotational position of the die cut roller so that the sheet to which the top index tab is formed is fed at the determined sheet feeding timing and the sheet to which an index tab other than the top index tab is formed is fed at a timing shifted from the determined sheet feeding timing by a calculated shift period.

In the index tab forming system described above, for example, every time the sheet to which the last index tab is formed is fed, the sheet feeding counter resets a count of the number of times of sheet feeding.

The index tab forming system described above preferably further includes:
  a sheet tab position input unit configured to receive input of a position of a front end of the top index tab formed to the sheet;
  a shift distance input unit configured to receive input of a shift distance between the index tabs;
  a tab quantity input unit configured to receive input of the total number of index tabs; and
  a blade die tab position input unit configured to receive input of a position of a front end of an index tab portion of the blade die.

Advantageous Effects of Invention

The index tab forming system of the present invention can sequentially form index tabs on a plurality of sheets without replacing a blade die. Accordingly, the index tab forming system of the present invention can reduce the cost associated with blade dies and omit collation operation after the index tabs are formed.

DESCRIPTION OF EMBODIMENTS

An index tab forming system according to one embodiment of the present invention will be described below with reference to the attached drawings.

Figure 1:
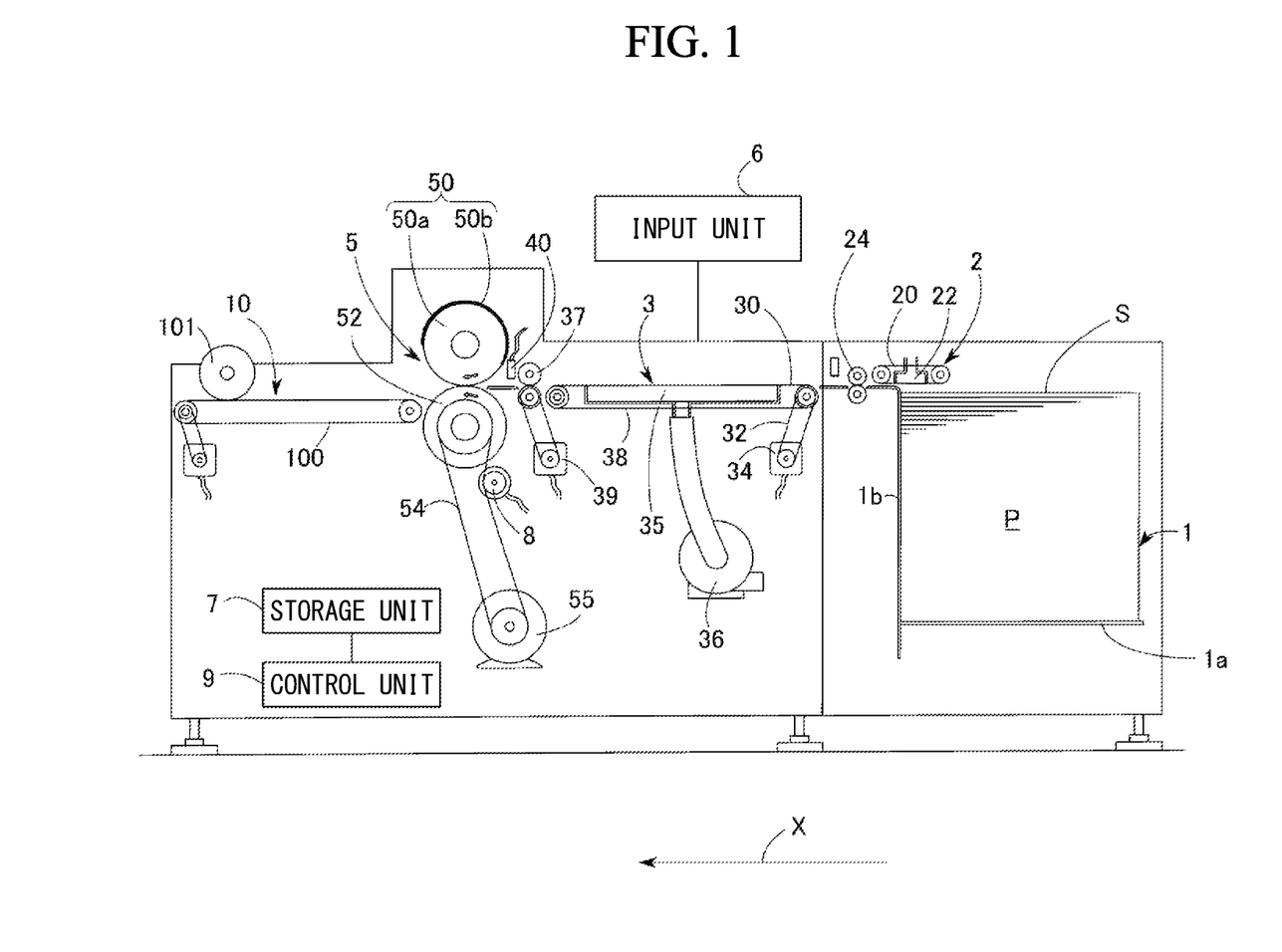
FIG. 1 is a schematic diagram of an overall index tab forming system according to one embodiment of the present invention.

FIG. 1 is a schematic diagram of the overall index tab forming system according to one embodiment of the present invention. The arrow X represents a conveyance direction of a sheet S. The index tab forming system includes a sheet stack unit (a sheet stacker) 1, a sheet feeding unit (a sheet feeder) 2, a conveyance unit 3, a rotary die cutter 5, an input unit 6, a storage unit (a memory) 7, a rotational position detection unit (a rotational position detector) 8, a control unit 9, and a discharge unit 10.

The sheet stack unit 1 has a horizontal sheet loading shelf 1a arranged movably to be lifted and lowered and a perpendicular sheet alignment plate 1b arranged in front of the sheet loading shelf 1a and configured to align front ends of respective sheets S of a sheet stack P. The sheet stack P is placed on the sheet loading shelf 1a.

The sheet feeding unit 2 has a suction belt conveyor 20, a suction duct 22, and a sheet feeding roller pair 24 on the upper front side of the sheet stack unit 1.

The suction duct 22 is arranged on the upper side of the lower belt of the suction belt conveyor 20 and sucks and holds the uppermost sheet S of the sheet stack P. The suction belt conveyor 20 feeds the sucked and held sheet S out to the sheet feeding roller pair 24. The sheet feeding roller pair 24 rotates in the direction in which the sheet S is taken in from the suction belt conveyor 20, and the suction belt conveyor 20 stops the operation thereof when the sheet S is taken in the sheet feeding roller pair 24.

The conveyance unit 3 has a suction belt conveyor 30, a timing belt 32, a motor 34, a suction duct 35, an intake pump 36, a conveyance roller pair 37, a timing belt 38, a motor 39, and a sheet detection sensor 40.

The suction belt conveyor 30 is arranged downstream of the sheet feeding roller pair 24 and driven by the motor 34, to convey a sheet S fed from the sheet feeding unit 2 to the rotary die cutter 5 side. The suction duct 35 is arranged on the underside of the upper belt that forms a conveyance surface of the suction belt conveyor 30. The suction duct 35 has an intake port in the upper surface and is connected to the intake pump 36.

The conveyance roller pair 37 is arranged in downstream of the suction belt conveyor 30 and driven by the motor 39 to convey the sheet S conveyed from the suction belt conveyor 30 to the rotary die cutter 5.

Figure 4:
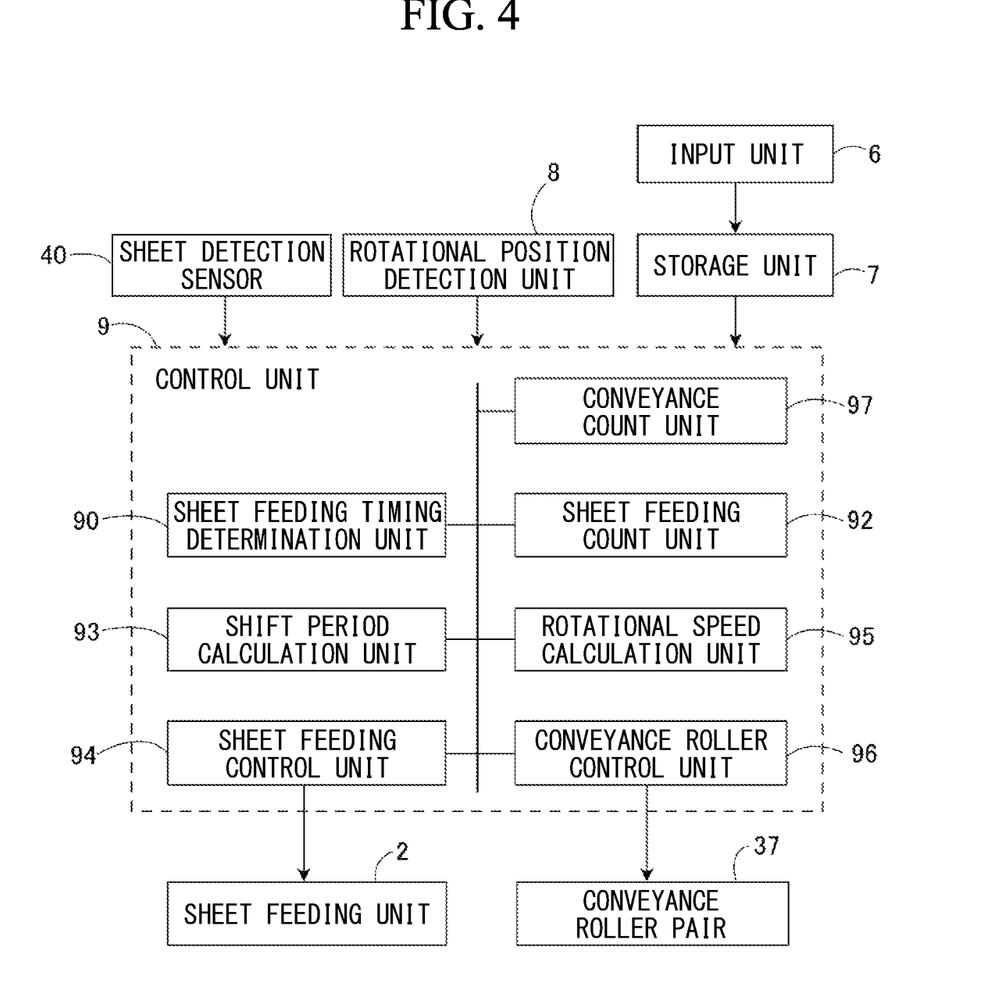
FIG. 4 is a block diagram of a control unit illustrated in FIG. 1.

The sheet detection sensor 40 is arranged downstream of the conveyance roller pair 37, detects a predetermined position of the conveyed sheet S, and transmits a detection signal to the control unit 9 (see FIG. 4). Specifically, the sheet detection sensor 40 is an infrared sensor, an image reader that reads a mark printed on a predetermined portion of a sheet S, or the like and detects the front end of the sheet S, a mark on the sheet S, or the like. In the present embodiment, the sheet detection sensor 40 is an infrared sensor and detects the front end of a sheet S.

The rotary die cutter 5 has a die cut roller 50, a receiving roller 52, a timing belt 54, and a motor 55.

The die cut roller 50 has a magnet roller 50a and a sheet-like blade die 50b used for index tab forming mounted on the magnet roller 50a.

Figure 2:
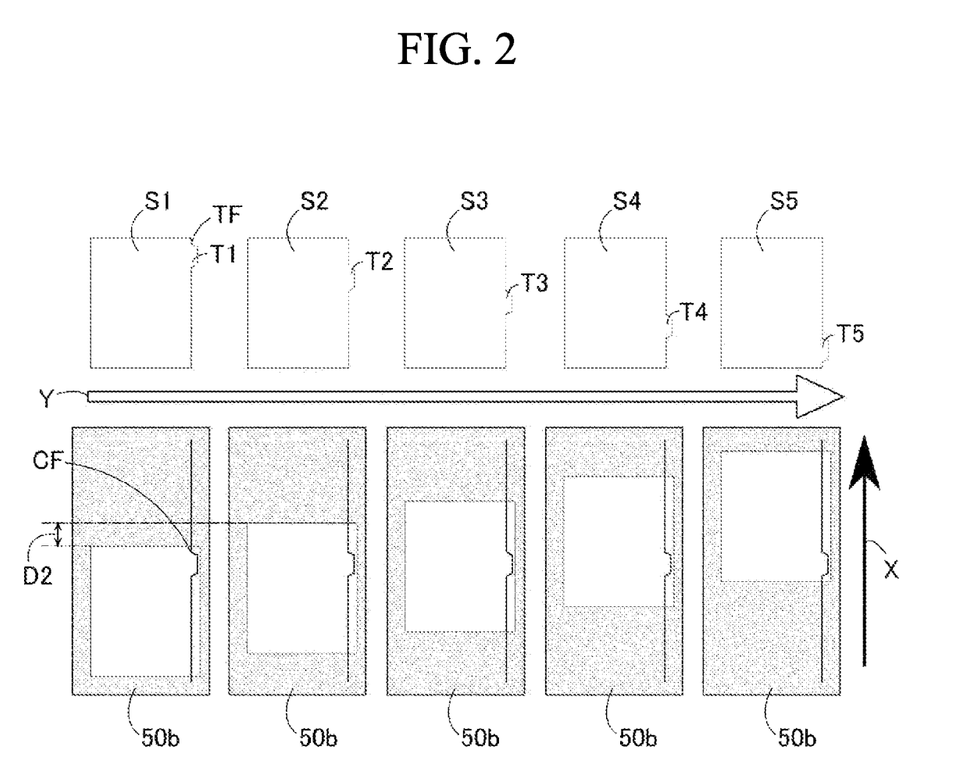
FIG. 2 is a plan view illustrating a blade die mounted on a die cut roller illustrated in FIG. 1 and each sheet to which an index tab is formed.

As illustrated in FIG. 2, the blade die 50b is formed such that the circumferential length is sufficiently longer than the length of a sheet S so that index tabs T can be formed sequentially on sheets S1 to S5. The arrow Y represents the processing order of sheets S. An index tab T1 of the sheet S1 corresponds to "top index tab" of the present invention. Further, the distance between a front end TF of the index tab T1 of the sheet S1 and a front end TF of an index tab T2 of the sheet S2 (corresponding to a shift distance d2) corresponds to "shift distance between respective index tabs" of the present invention. The index tabs T are formed to the sheets S1 to S5 sequentially at different positions, respectively. The number of index tabs T (five in the present embodiment) corresponds to "the total number of index tabs" of the present invention.

As illustrated in FIG. 1, the receiving roller 52 is arranged parallel to the die cut roller 50 with a predetermined spacing thereto. The motor 55 is an induction motor, which is only an example and is not limited thereto. The receiving roller 52 is connected to the motor 55 via the timing belt 54 and is driven by the motor 55. The die cut roller 50 is coupled to the receiving roller 52 via a gear (not illustrated) and thereby rotates in synchronization with the receiving roller 52.

The die cut roller 50 and the receiving roller 52 continually rotate at a constant speed in the direction in which a sheet S is introduced from the conveyance roller pair 37. The rotary die cutter 5 is configured such that a sheet S is conveyed by the conveyance roller pair 37 through a gap between the die cut roller 50 and the receiving roller 52, and an index tab T is formed by the blade die 50b during the conveyance.

In the present embodiment, the rotational position detection unit 8 is a rotary encoder, which is only an example and is not limited thereto. The rotational position detection unit 8 is configured to come into contact with the timing belt 54 from the outside and rotate in synchronization with driving of the timing belt 54. Accordingly, the rotational position detection unit 8 detects the rotational position of the receiving roller 52, detects the rotational position of the die cut roller 50 that rotates in synchronization with the receiving roller 52, and as a result, detects the rotational position of the front end CF (see FIG. 2) of an index tab portion of the blade die 50b.

Figure 3:
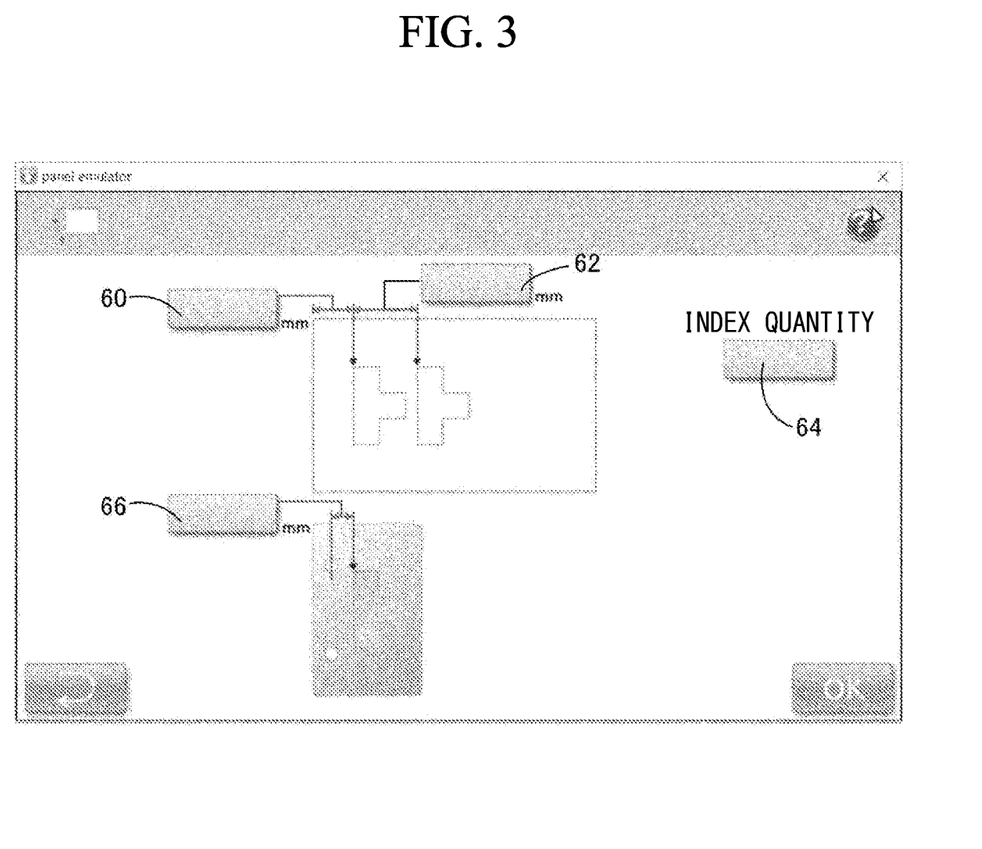
FIG. 3 is a diagram illustrating one example of an input unit illustrated in FIG. 1.

As illustrated in FIG. 3, the input unit 6 is a touch panel, which is only an example and is not limited thereto. The input unit 6 has a sheet tab position input unit 60 that receives input of a distance from the front end of the sheet S1 to the front end TF (see FIG. 2) of the index tab (hereinafter, simply referred to as "index tab") T1 to be formed, a shift distance input unit 62 that receives input of a shift distance (d2) that is the distance from the front end TF of the index tab T1 to the front end TF of the next index tab T2, a tab quantity input unit 64 that receives input of the total number of index tabs T, and a blade die tab position input unit 66 that receives input of a position of the front end CF of the index tab portion of the blade die 50b. The input values are stored in the storage unit 7, respectively.

As illustrated in FIG. 4, the control unit 9 has a sheet feeding timing determination unit 90, a sheet feeding count unit (a sheet feeding counter) 92, a shift period calculation unit 93, a sheet feeding control unit (a sheet feeding controller) 94, a rotational speed calculation unit 95, a conveyance roller control unit (a conveyance roller controller) 96, and a conveyance count unit (a conveyance counter) 97.

The sheet feeding timing determination unit 90 determines a sheet feeding timing of the sheet S1 on which the index tab T1 is formed. How to find a sheet feeding timing will be described with reference to FIG. 5. The correspondence relationship between each symbol in FIG. 5 and an element denoted by each symbol is as follows.

Figure 5:
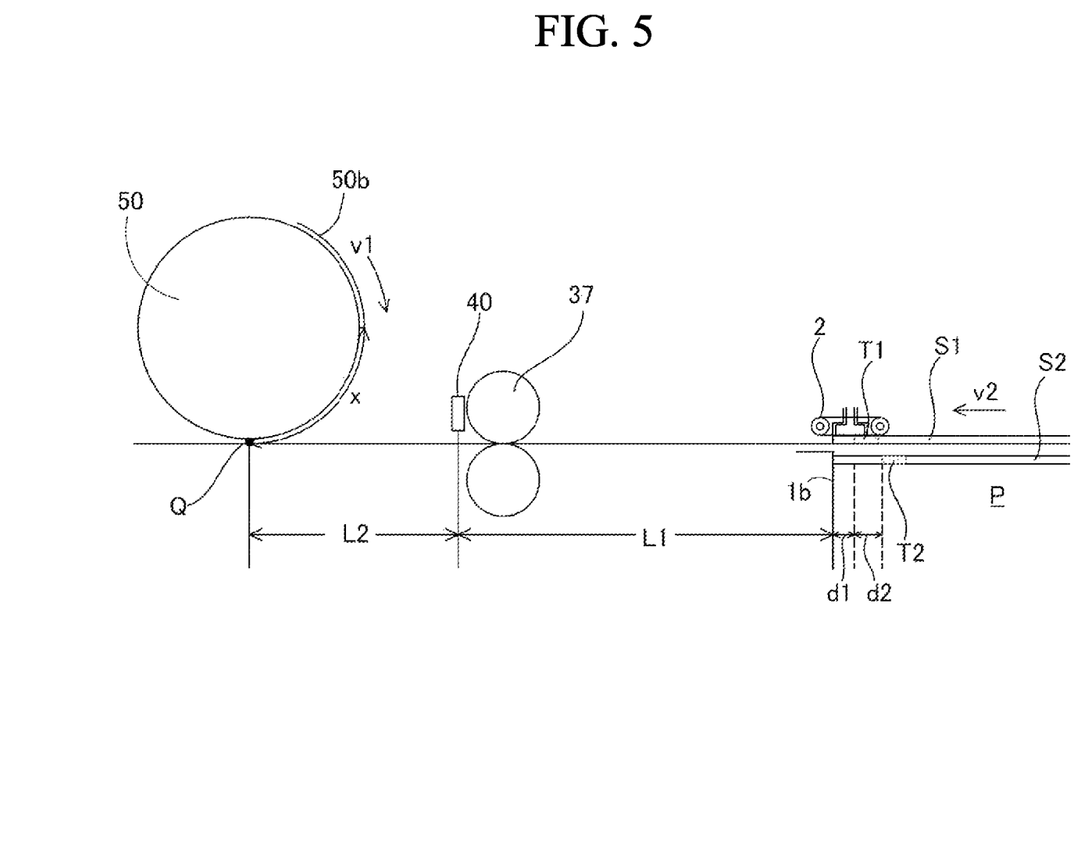
FIG. 5 is a diagram illustrating a sheet feeding timing.

T1 (T2): a portion in which an index tab is formed
L1: the distance from the front end of a sheet S on the sheet loading shelf 1a to the sheet detection sensor 40
L2: the distance from the sheet detection sensor 40 to a point Q
Q: the lowermost point of the die cut roller 50
v1: a circumferential speed of the blade die 50b
v2: a conveyance speed of a sheet S
d1: the distance from the front end of a sheet S to the front end TF of the index tab T1
d2: the distance (a shift distance) between front ends TF of respective index tabs T
x: the distance from the point Q to the front end CF of an index tab portion of the blade die 50b along the circumference of the die cut roller 50

As illustrated in FIG. 5, if v2 is constant, a period t1 after an operation of the sheet feeding unit 2 is started (after conveyance of a sheet S is started) and before the front end TF of the index tab T1 of the sheet S1 reaches the point Q is:

$$t1=(L1+L2+d1)/v2.$$

Therefore, if feeding of the sheet S1 by the sheet feeding unit 2 is started when the position of the front end CF of the index tab portion of the blade die 50b is at a rotational position that satisfies $$x=v1 \times t1,$$

the front end TF of the index tab T1 of the sheet S1 and the front end CF of the index tab portion of the blade die 50b match at the point Q, and the index tab T1 is formed at an exact position. In such a way, the sheet feeding timing determination unit 90 determines a sheet feeding timing such that feeding of the sheet S1 by the sheet feeding unit 2 is started in response to the front end CF of the index tab portion of the blade die 50b reaching a rotational position that satisfies $x=v1 \times t1$.

The sheet feeding count unit 92 counts the number of times n1 that the sheet feeding unit 2 feeds a sheet.

The shift period calculation unit 93 calculates a period to shift sheet feeding timings of the sheets S other than the sheet S1 based on the shift distance d2 input to the shift distance input unit 62 and the number of times n1 of sheet feeding counted by the sheet feeding count unit 92. That is, since the sheets S2 to S5 other than the sheet S1 are required to be fed with a predetermined period shifted from the timing when the sheet S1 is fed by the sheet feeding unit 2 based on the positions of the index tabs T2 to T5, the shift period calculation unit 93 calculates a period st to be shifted.

As illustrated in FIG. 2, in the case of the present embodiment, for the sheet S2 to sheet S5, it is required to shift the feeding timings forward by a certain period obtained by multiplying the shift distance d2 by the number of times n1 of sheet feeding.

As illustrated in FIG. 5, for example, when the sheet S2 is fed, if v2 is constant, a period t2 until the front end TF of the index tab T2 of the sheet S2 reaches the point Q is $$t2=(L1+L2+d1+d2)/v2.$$

That is, the period t2 until the front end TF of the index tab T2 reaches the point Q is longer by d2/v2 than the period t1 until the front end TF of the index tab T1 reaches the point Q. Therefore, the shift period calculation unit 93 calculates the period st to shift the feeding timings of the sheets S2, to S5 other than the sheet S1 to which index tab T1 is formed, by the following equation.

$$st=d2 \times n1/v2$$

The sheet feeding control unit 94 controls, based on a rotational position of the die cut roller 50, the sheet feeding unit 2 to feed the sheet S1 to which the index tab T1 is formed at the sheet feeding timing determined by the sheet feeding timing determination unit 90. Further, the sheet feeding control unit 94 controls the sheet feeding unit 2 so as to feed the sheets S2 to S5, to which other index tabs T2 to T5 are formed, at timings shifted forward from the sheet feeding timing by the shift period st calculated by the shift period calculation unit 93. The sheet feeding count unit 92 may reset the count of the number of times n1 of sheet feeding every time the sheet S5 to which the last index tab T5 is formed is fed by the sheet feeding unit 2. Accordingly, the operation in which the sheet feeding unit 2 feeds the sheets S1 to S5 is repeated.

The conveyance count unit 97 counts the number of times n2 that the conveyance unit 3 conveys a sheet S to the rotary die cutter 5.

The rotational speed calculation unit 95 calculates a rotational speed of the conveyance roller pair 37 that causes the front end CF of the index tab portion of the blade die 50*b* and the front end TF of the index tab T of the sheet S to match at the lowermost point of the die cut roller 50 based on the rotational position of the die cut roller 50, a detection signal generated when the sheet detection sensor 40 detects the front end of the sheet S, the number of times n2 that the conveyance unit 3 conveys the sheet S to the rotary die cutter 5, and the shift distance d2 between index tabs.

This will be described again with reference to FIG. 5. If it is assumed that the front end CF of the index tab portion of the blade die 50*b* is at a rotational position distant by a distance x from the point Q when the front end TF of the index tab T of the sheet S is detected by the sheet detection sensor 40, the period t until the blade die 50*b* reaches the point Q is:

$$t = x/v1.$$

Thus, for the front end TF of the index tab T to reach the point Q in this period, the sheet S is required to be conveyed at a speed of:

$$v = \{L2 + d1 + (d2 \times n2)\}/t.$$

Therefore, the rotational speed calculation unit 95 calculates the rotational speed of the conveyance roller pair 37 that can obtain the conveyance speed v.

Next, the conveyance roller control unit 96 controls the rotation of the conveyance roller pair 37 based on the rotational speed calculated by the rotational speed calculation unit 95. Accordingly, the timing of the sheet S introduced into the rotary die cutter 5 is corrected, and the index tab T is formed at a suitable position of the sheet S.

The conveyance count unit 97 may reset the count of the number of times n2 of conveyance every time the sheet S5 to which the last index tab T5 is formed is conveyed to the rotary die cutter 5 by the conveyance unit 3. Accordingly, the operation in which the conveyance unit 3 conveys the sheets S1 to S5 is repeated. That is, counts counted by the sheet feeding count unit 92 and the conveyance count unit 97 are reset at a predetermined timing, and thereby the operation in which the index tabs T1 to T5 are formed in the index tab forming system is repeated.

Further, the conveyance roller control unit 96 controls the rotational speed of the conveyance roller pair 37 so that the conveyance speed v of the sheet S matches the circumferential speed v1 of the blade die 50*b* before the sheet S5 leaves the blade die 50*b* after the front end TF of the index tab T of the sheet S matches the front end CF of the index tab portion of the blade die 50*b* at the point Q.

The discharge unit 10 has a conveyor belt 100 extending from the exit of the die cut roller 50 and the receiving roller 52 to the discharge port of the index tab forming system and a conveyance roller 101 arranged near the downstream end of the conveyor belt 100. The discharge unit 10 uses the conveyor belt 100 and the conveyance roller 101 to convey the sheet S to which the index tab T has been formed and discharge the sheet S from the discharge port of the index tab forming system.

As described above, the index tab forming system can sequentially form the index tabs T1 to T5 to the plurality of sheets S1 to S5 without replacing the blade die 50*b*. In addition, the index tab forming system can form the index tab T at a suitable position of the sheet S by correcting the timing of the sheet S introduced into the rotary die cutter 5 by the conveyance roller pair 37. Furthermore, the index tab forming system feeds the sheet S while shifting the sheet feeding timing in accordance with the position of the index tab T to be formed and thus can convey the sheet S to the rotary die cutter 5 without suspending the conveyance of the sheet S in front of the rotary die cutter 5 or slowing down the drive speed of the suction belt conveyor 30 to be lower than a normal drive speed.

Although one embodiment of the present invention has been described above, the configuration of the present invention is not limited to the embodiment described above. The configuration of the embodiment described above may be modified within the scope of the configuration recited in the claims of the present application.

REFERENCE SIGNS LIST 1 sheet stack unit
1*a* sheet loading shelf
1*b* sheet alignment plate
2 sheet feeding unit
20 suction belt conveyor
22 suction duct
24 sheet feeding roller pair
3 conveyance unit
30 suction belt conveyor
32 timing belt
34 motor
35 suction duct
36 intake pump
37 conveyance roller pair
38 timing belt
39 motor
40 sheet detection sensor
5 rotary die cutter
50 die cut roller
50*a* magnet roller
50*b* blade die
52 receiving roller
54 timing belt
55 motor
6 input unit
60 sheet tab position input unit
62 shift distance input unit
64 tab quantity input unit
66 blade die tab position input unit
7 storage unit
8 rotational position detection unit
9 control unit
90 sheet feeding timing determination unit
92 sheet feeding count unit
93 shift period calculation unit
94 sheet feeding control unit
95 rotational speed calculation unit
96 conveyance roller control unit
97 conveyance count unit
10 discharge unit
100 conveyor belt
101 conveyance roller
P sheet stack
S sheet
T index tab
TF front end of an index tab

The invention claimed is:

1. An index tab forming system configured to sequentially form index tabs to a plurality of sheets, the index tab forming system comprising:
   a rotary die cutter including a die cut roller in which a sheet-like blade die used for index tab forming is mounted and a receiving roller arranged parallel to the die cut roller with a predetermined spacing to the die cut roller;
   a rotational position detector configured to detect a rotational position of the die cut roller;
   a memory configured to store a position of a front end of a top index tab of the index tabs, a shift distance between the index tabs, the total number of index tabs, and a position of a front end of an index tab portion of the blade die;
   a sheet stacker configured to stack a sheet stack;
   a sheet feeder configured to feed the sheet one by one from the sheet stack;
   a conveyance unit configured to convey the sheet received from the sheet feeder to the rotary die cutter, the conveyance unit including:
      a conveyor extending between the sheet feeder and the rotary die cutter and configured to convey the sheet;
      a sheet detection sensor arranged in downstream of the conveyor and configured to detect a position of the sheet; and
      a conveyance roller pair arranged parallel to the die cut roller and configured to convey the sheet; and
   a controller configured to:
      count the number of times that the conveyance unit conveys the sheet to the rotary die cutter;
      calculate a rotational speed of the conveyance roller pair based on the rotational position of the die cut roller, a detection signal generated when the sheet detection sensor detects a sheet position, the number of times that the conveyance unit conveys the sheet to the rotary die cutter, and a shift distance between the index tabs, the conveyance roller pair being configured to cause a front end of an index tab portion of the blade die and a front end of each of the index tabs formed on the sheet to match at the lowermost point of the die cut roller; and
      control a rotational speed of the conveyance roller pair based on the calculated rotational speed,
   wherein the blade die has a circumferential length that is longer than a length of the sheet so that the index tab is formed at any position of the sheet in a conveyance direction.

2. The index tab forming system according to claim 1, wherein every time the last sheet to which the index tab is formed is conveyed to the rotary die cutter, and
   wherein the controller is configured to reset a count of the number of times that the sheet is conveyed to the die cut roller.

3. The index tab forming system according to claim 1, wherein the controller is configured to:
   count the number of times that the sheet feeder feeds a sheet;
   determine a sheet feeding timing of the sheet to which the top index tab is formed;
   calculate a period to shift a feeding timing of the sheet based on a shift distance between the index tabs and the number of times that the sheet feeding unit feeds a sheet; and
   control the sheet feeder based on the rotational position of the die cut roller so that the sheet to which the top index tab is formed is fed at the determined sheet feeding timing and the sheet to which an index tab other than the top index tab is formed is fed at a timing shifted from the determined sheet feeding timing by a calculated shift period.

4. The index tab forming system according to claim 3, wherein every time the sheet to which the last index tab is formed is fed, and
   wherein the controller is configured to reset a count of the number of times of sheet feeding.

5. The index tab forming system according to claim 1 further comprising:
   a sheet tab position input unit configured to receive input of a position of a front end of the top index tab formed to the sheet;
   a shift distance input unit configured to receive input of a shift distance between the index tabs;
   a tab quantity input unit configured to receive input of the total number of index tabs; and
   a blade die tab position input unit configured to receive input of a position of a front end of an index tab portion of the blade die.

6. The index tab forming system according to claim 1, further comprising a sheet feeding controller configured to control an operation of the sheet feeder.

7. The index tab forming system according to claim 1, further comprising a sheet feeding counter configured to count the number of times that the sheet feeder feeds a sheet.

8. The index tab forming system according to claim 1, further comprising a sheet feeding timing determination unit configured to determine a sheet feeding timing of the sheet to which the top index tab is formed.

9. The index tab forming system according to claim 1, further comprising a shift period calculation unit configured to calculate a period to shift a feeding timing of the sheet based on a shift distance between the index tabs and the number of times that the sheet feeding unit feeds a sheet.

10. The index tab forming system according to claim 1, further comprising a sheet tab position input unit configured to receive input of a position of a front end of the top index tab formed to the sheet.

11. The index tab forming system according to claim 1, further comprising a shift distance input unit configured to receive input of a shift distance between the index tabs.

12. The index tab forming system according to claim 1, further comprising a tab quantity input unit configured to receive input of the total number of index tabs.

13. The index tab forming system according to claim 1, further comprising a blade die tab position input unit configured to receive input of a position of a front end of an index tab portion of the blade die.

14. The index tab forming system according to claim 1, wherein the sheet stacker comprises:
   a horizontal sheet loading shelf movably arranged to be lifted and lowered; and
   a perpendicular sheet alignment plate arranged in front of the sheet loading shelf and configured to align front ends of respective sheets of the sheet stack.

15. The index tab forming system according to claim 1, wherein the sheet feeding unit comprises:
   a suction belt conveyor;
   a suction duct; and
   a sheet feeding roller pair on the sheet stacker.

* * * * *